(12) United States Patent
Hsieh (10) Patent No.: US 8,437,586 B2
(45) Date of Patent: May 7, 2013

(54) PHOTOELECTRIC CONNECTION SYSTEM WITH WAVEGUIDES

(75) Inventor: Wen-Yi Hsieh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 206 days.

(21) Appl. No.: 13/015,232

(22) Filed: Jan. 27, 2011

(65) Prior Publication Data

US 2011/0182554 A1  Jul. 28, 2011

(51) Int. Cl.
*G02B 6/12* (2006.01)

(52) U.S. Cl.
USPC .............................. 385/14; 385/101; 439/151

(58) Field of Classification Search .................... 385/14, 385/101; 439/151–157
See application file for complete search history.

(56) References Cited

U.S. PATENT DOCUMENTS

| | | | | |
|---|---|---|---|---|
| 4,758,063 A * | 7/1988 | Konechny, Jr. | ................. | 385/53 |
| 6,233,376 B1 * | 5/2001 | Updegrove | .................... | 385/14 |
| 6,583,402 B1 * | 6/2003 | Watanabe | ..................... | 250/215 |
| 7,699,619 B2 * | 4/2010 | Mizumura | ...................... | 439/71 |
| 7,918,671 B2 * | 4/2011 | Chen et al. | ...................... | 439/70 |
| 2004/0114854 A1 * | 6/2004 | Ouchi | ............................. | 385/14 |
| 2006/0189204 A1 * | 8/2006 | Wang et al. | .................. | 439/495 |

* cited by examiner

*Primary Examiner* — Ellen Kim
(74) *Attorney, Agent, or Firm* — Wei Te Chung; Ming Chieh Chang (57) ABSTRACT

A photoelectric connection assembly includes a circuit board defining conductive pads on a first surface thereof and waveguides embedded therein, an electrical connector assembled to the circuit board and a light transmission module. The electrical connector includes a seat defining a first receiving cavity for receiving the conversion module and a second receiving cavity below the first receiving cavity, a cover rotatably associated with a rear end of the seat and rotating to shield the first receiving cavity and conductive terminals loaded on the seat. The terminals include contacting portions extending in the first receiving cavity for electrical connection with the conversion module and leg portions connecting with the conductive pads. The light transmission module is received in the second receiving cavity and includes conversion module.

20 Claims, 9 Drawing Sheets

PHOTOELECTRIC CONNECTION SYSTEM WITH WAVEGUIDES

BACKGROUND OF THE INVENTION

1. Field of the Invention

The present invention relates to a photoelectric connection system which is adapted for transmission electric and optical signals.

2. Description of Related Art

Signal transmission through optical fiber cables has been developed since light transmission is proven with more advantage than electrics transmission. For example, Intel has issued Light Peak Technology on its website. The Light Peak delivers high bandwidth starting at 10 Gb/s with the potential ability to scale to 100 Gb/s over the next decade. Optical technology also allows for smaller connectors and longer, thinner, and more flexible cables than currently possible. Light Peak also has the ability to run multiple protocols simultaneously over a single cable, enabling the technology to connect devices such as peripherals, displays, disk drives, docking stations, and more. The connector as shown in website connects with a plurality of optical fiber cables at a rear end thereof, through which signals are transmitted by the optical fiber cables to other devices.

We hope to desire an improved photoelectric connection system on basis of the Light Peak Technology.

SUMMARY OF THE INVENTION

An object of the present invention is to provide a photoelectric connection assembly with simple assembly.

In order to achieve above-mentioned object, a photoelectric connection assembly adapted for receiving a photoelectric signal conversion module comprises a circuit board defining conductive pads on a first surface thereof and waveguides embedded therein, an electrical connector assembled to the circuit board and a light transmission module. The electrical connector comprises a seat defining a first receiving cavity for receiving the photoelectric signal conversion module and a second receiving cavity below the first receiving cavity, a cover rotatably associated with a rear end of the seat and rotating to shield the first receiving cavity and a plurality of conductive terminals loaded on the seat. The terminals comprise contacting portions extending in the first receiving cavity for electrical connection with the photoelectric signal conversion module and leg portions connecting with the conductive pads of the circuit board. The light transmission module is received in the second receiving cavity and comprises a first port coupled with the waveguides of the circuit board and a second port coupled with the photoelectric signal conversion module.

Other objects, advantages and novel features of the present invention will become more apparent from the following detailed description of the present embodiment when taken in conjunction with the accompanying drawings.

DETAILED DESCRIPTION OF THE INVENTION

Reference will now be made to the drawing figures to describe the preferred embodiment of the present invention in detail.

Figure 1:
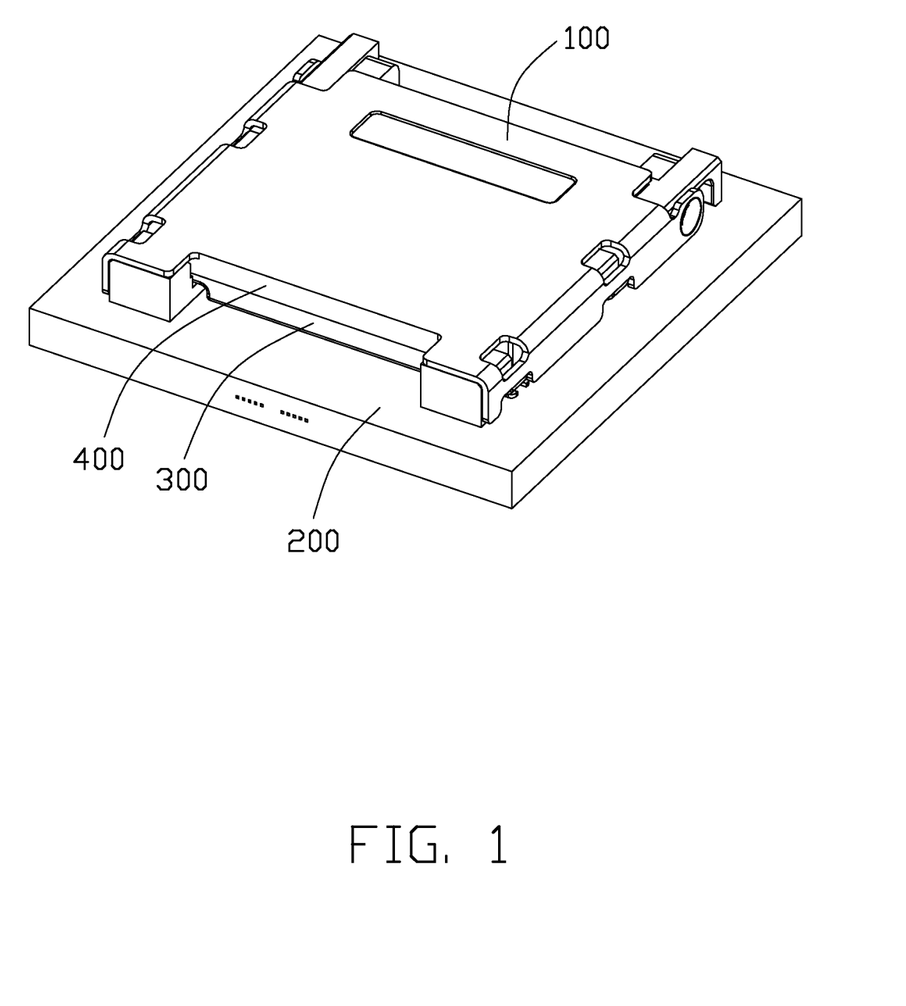
FIG. 1 is an assembled perspective view of a photoelectric connection system of a first embodiment in accordance with the present invention.
Figure 2:
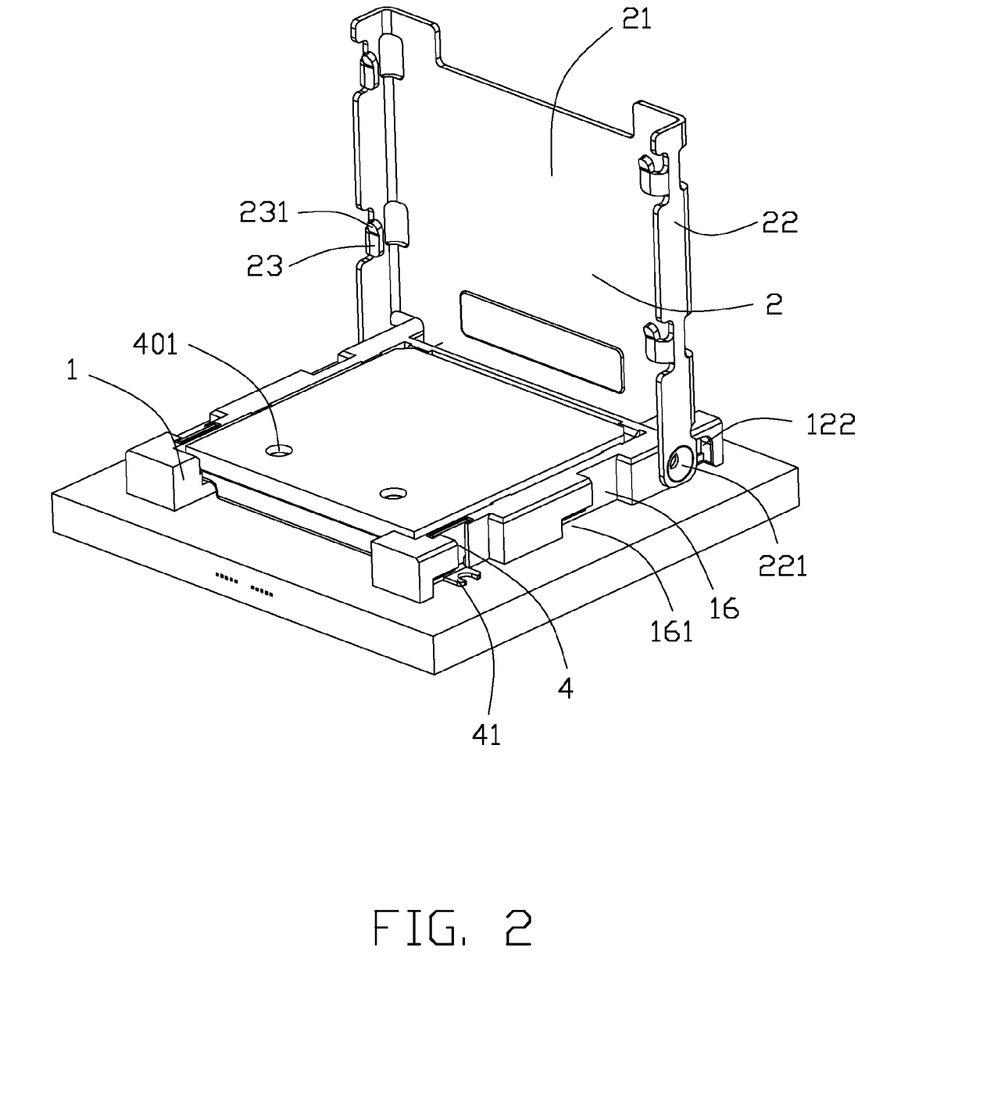
FIG. 2 is a perspective view of the system, wherein a cover is in an open statue.

Referring to FIGS. 1 and 2, a photoelectric connection system in accordance with the invention is illustrated, which includes a circuit board 200 embedded with waveguides, an electrical connector 100 seated on a circuit board 200, a light transmission module 300 and a photoelectric signal conversion module 400 received in the connector to complete signal transmission between the circuit board and the photoelectric signal conversion module 400. The electrical connector 100 includes a an integrated insulating seat 1 with an upwardly-opening receiving cavity and a cover pivotably retained at a rear end of the seat 1 so as to cover the conversion module 400 in the receiving cavity. A description of the elements will be given hereinafter.

Figure 3:
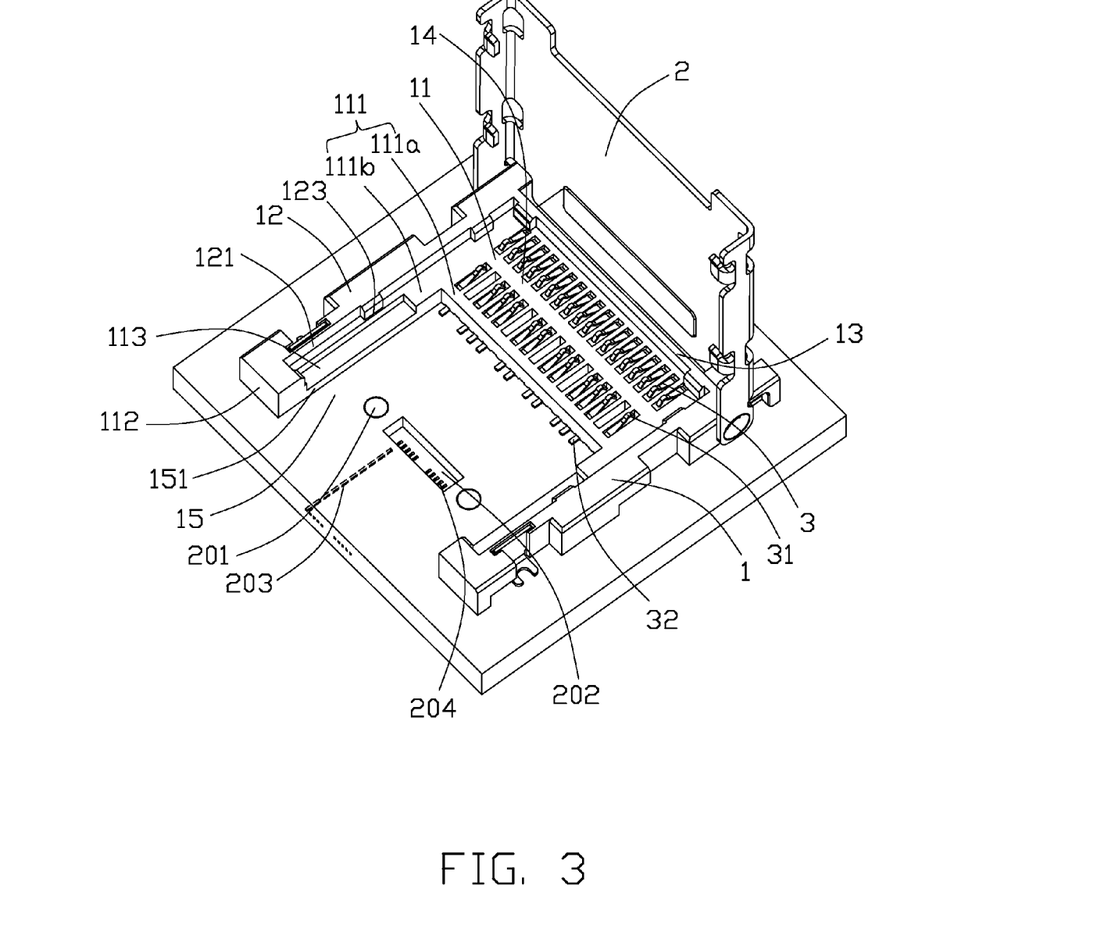
FIG. 3 is a perspective view of the system, wherein two modules are taken off.

Referring to FIG. 3 combination with FIG. 2, the seat 1 of the electrical connector includes a bottom or base wall 11, and three sidewalls, two parallel lateral sidewalls 12 and a rear sidewall 13 upright extending from the bottom wall to commonly define a first receiving cavity 14 opening upward. A front portion of the bottom wall 11 is cut out to define a notch which is defined as a second receiving cavity 15 while a rear portion of the bottom wall 11 is kept to define a plurality of terminal passageways (not labeled) upright through an inner or upper surface 111 and a bottom surface opposite confronting with the circuit board. Two rows of conductive terminals 3 lined between the lateral sidewalls 12 are retained in the passageways and comprise elastic contacting portions 31 projecting upwards in the first receiving cavity and connecting portions 32 located below the second receiving cavity to be soldered to the circuit board. The first receiving cavity 15 is bounded by inner faces 121 of the sidewalls and the inner surface 111 of the bottom wall, while the second receiving cavity 15 is bounded by the inner faces 151 of the notch. The second receiving cavity is located just below the first receiving cavity 15.

The lateral sidewalls 12 of the seat 1 each define two cutouts 16 at outsides thereof. The front cutout 16 is retained with a retaining metal ear 4 with a horizontal section 41 intended to be soldered on the circuit board 200. The cover 2 of the connector made from metallic material, includes a main covering portion 21 and two lateral side walls 22. The sidewalls of the cover 2 defines a pair of inward shafts 221 formed by drawn method at a rear end thereof, which are received in corresponding L shaped sliding recesses 122 defined at the rear end of the seat. The sliding recesses 122 open downward so that the inward shafts 221 is assembled into the sliding recesses through the opening before the electrical connector is assembled on the circuit board. The inward shafts 221 are designed to slide in the sliding recesses forwardly and rearwards and rotate simultaneously. The main covering portion 21 is rotated downward to shied the first receiving cavity 14 and locking ears 23 are contained in the cutouts 16 and then slide forwards along with the cover to be limited by a slit 161 in front of the cutout 16 so as to prevent the cover from upward rotating. The inward shafts 221 fitly interfere with inner faces of the sliding recesses since the front portion of the sliding recesses is smaller than the rear portion of the recesses, rear movements of the inward shafts is overcome.

Referring to FIG. 3, the second receiving cavity 15 runs through a front sidewall 112 of the seat, lateral dimension of which is smaller than that of the first receiving cavity 14. That means the inner surface 111 of the bottom wall 11 is divided to two parts, a rear part 111a remains wholly along a lateral direction and a front part 111b located at two sides of the notch. The first receiving cavity is limited by the front sidewall 112 in front. The second part 111b of the inner surface 111 recesses downwards to define a containing recess 113, which run through the inner side 1151 of the notch so as to communicate with the second receiving cavity 15 while not arrive to the second part of the inner face and front sidewall 112, i.e., the containing recess 113 extending within the second receiving cavity in the front-to-rear direction. The lateral sidewalls 12, 13 define bumps 123 projecting into the first receiving cavity while not beyond the containing recesses 113 in the lateral direction.

The circuit board 200 includes conductive pads (not shown) at a rear position thereof corresponding to the connecting portions 32 of conductive terminals 3 and two positioning holes 201 at a front position. An upward-opening first groove 202 of rectangular shape is recessed from a top face of the circuit board 200, which is located between the two positioning holes 201. The circuit board 200 is embedded with a plurality of waveguides 203 (only one is illustrated by broken lines). The waveguides has one rows of lenses 204 projecting in the first groove 202 which is functioned as a coupling port.

Figure 4:
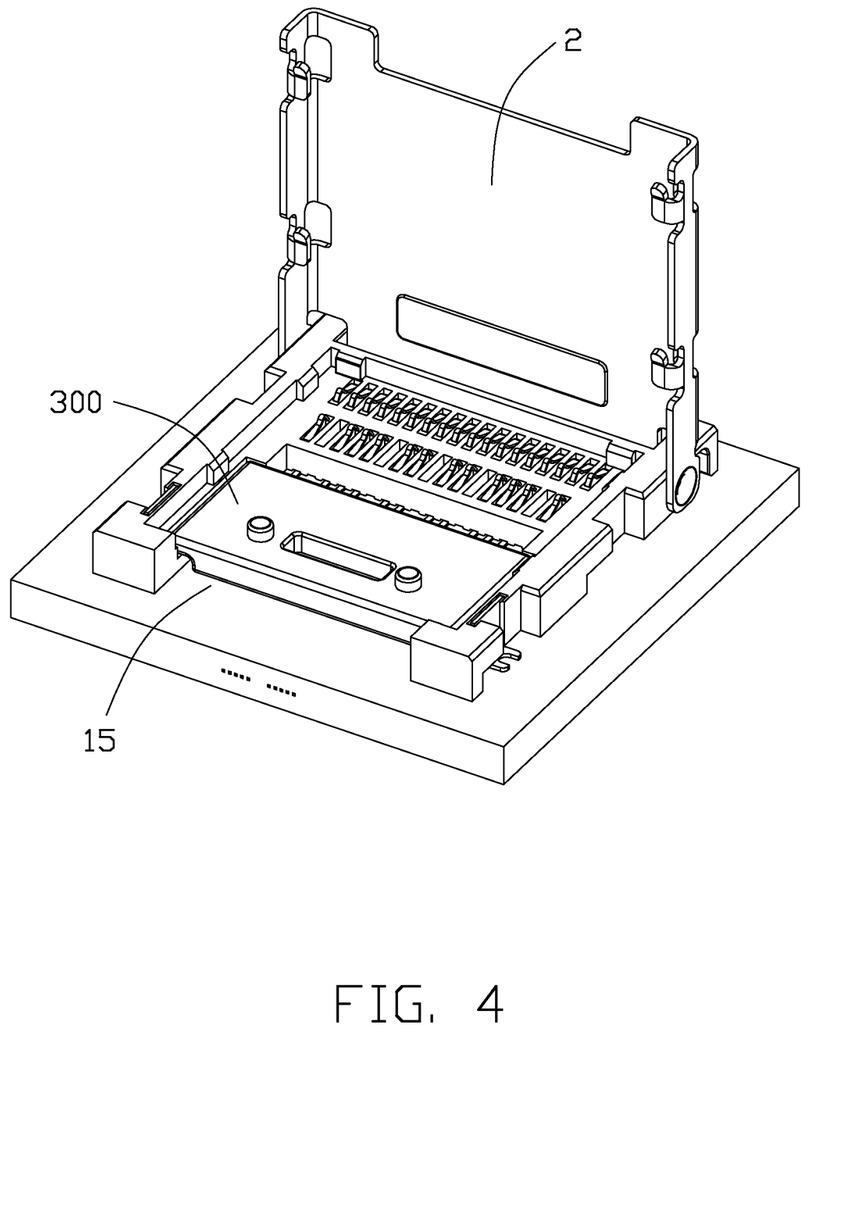
FIG. 4 is a perspective view of the system, wherein an upper module is taken off.
Figure 5:
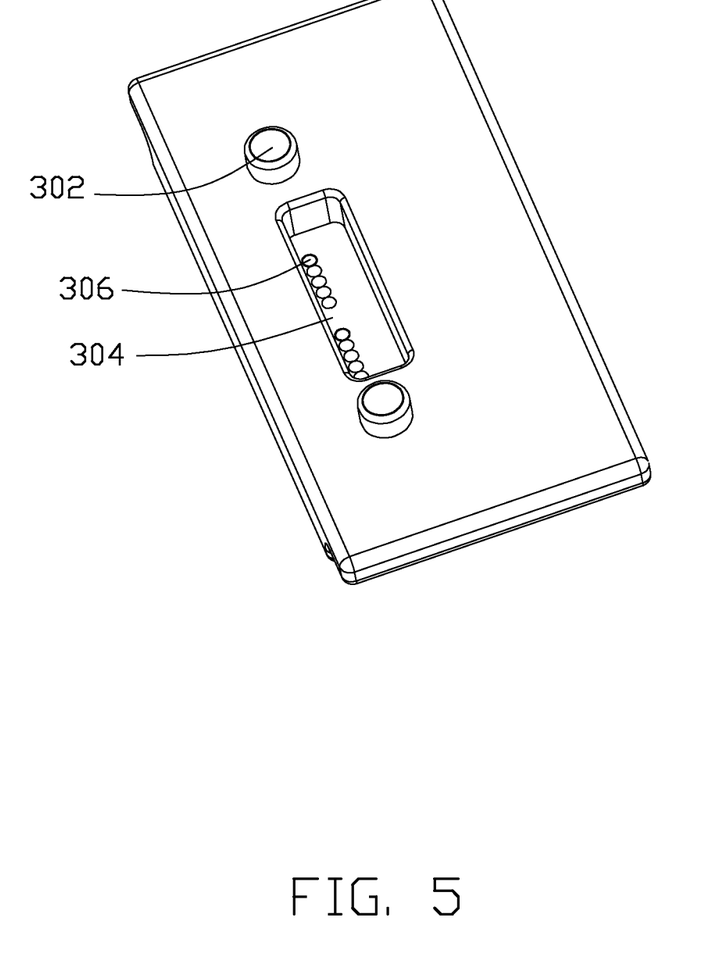
FIG. 5 is a top perspective view of a light transmission module.
Figure 6:
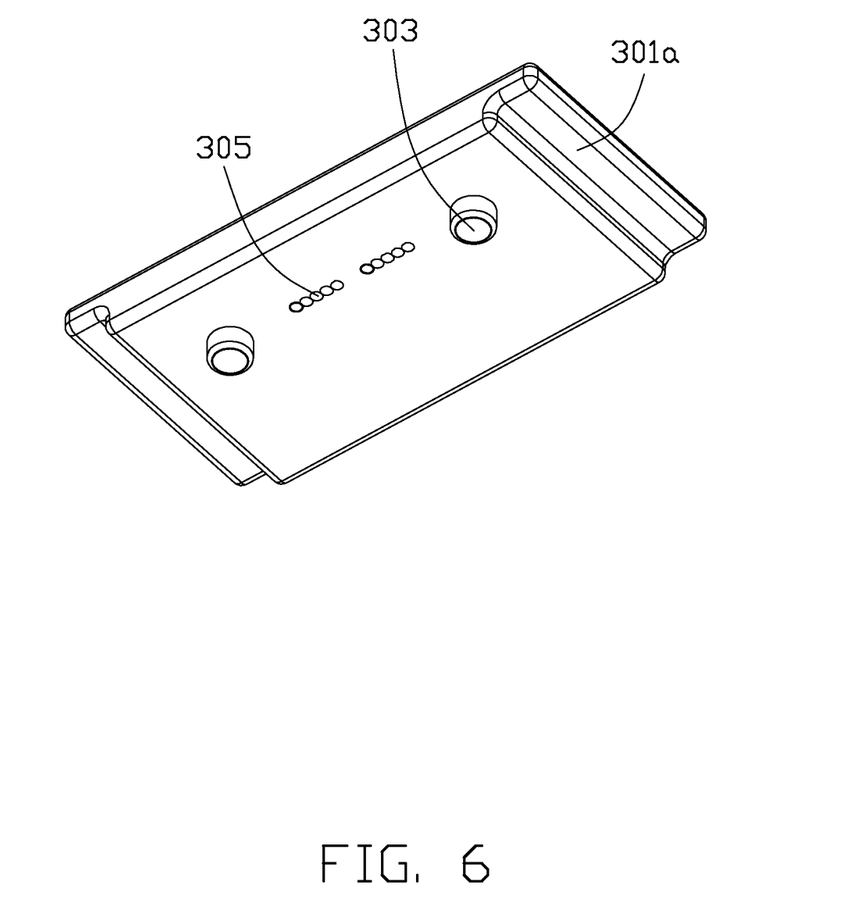
FIG. 6 is a bottom perspective view of the light transmission module.

Referring to FIG. 4, the light transmission module 300 is assembled in the second receiving cavity 15. Combination with FIGS. 5 and 6, the module 300 defines two retaining flanges 301a extending outward from top edges of two lateral sides thereof and two pairs of positioning posts 302, 303 at upper and lower surfaces thereof. One row of lenses 305 is defined between the pair of the post 303 functioned as a first port. A second groove 304 is recessed downward from the upper surface of the modules between the pair of the positioning holes 302 and one row of lenses 306 is defined at a bottom inner face of the second grooves 304 functioned as a second port. When the module is received in the second receiving cavity 15, the positioning posts 303 are inserted in the positioning holes 201 of circuit board 200 and the lenses 305 are aligned with the lenses 204 one by one. Light lines can be refracted between the lenses 204, 305.

After the light transmission module 300 is contained in the second receiving cavity 15, the photoelectric signal conversion module 400 is assembled in the first receiving cavity 15 as best shown in FIG. 2. The conversion module 400 defines positioning holes 401 which are just inserted by the positioning posts 302 of the light transmission module 300. The cover 4 rotates downward to retain the module 400 in the first receiving cavity. The transmission module 300 of this present invention can be easily taken off form the connector 100 when it need clean to keep a good transmission performance.

Figure 7:
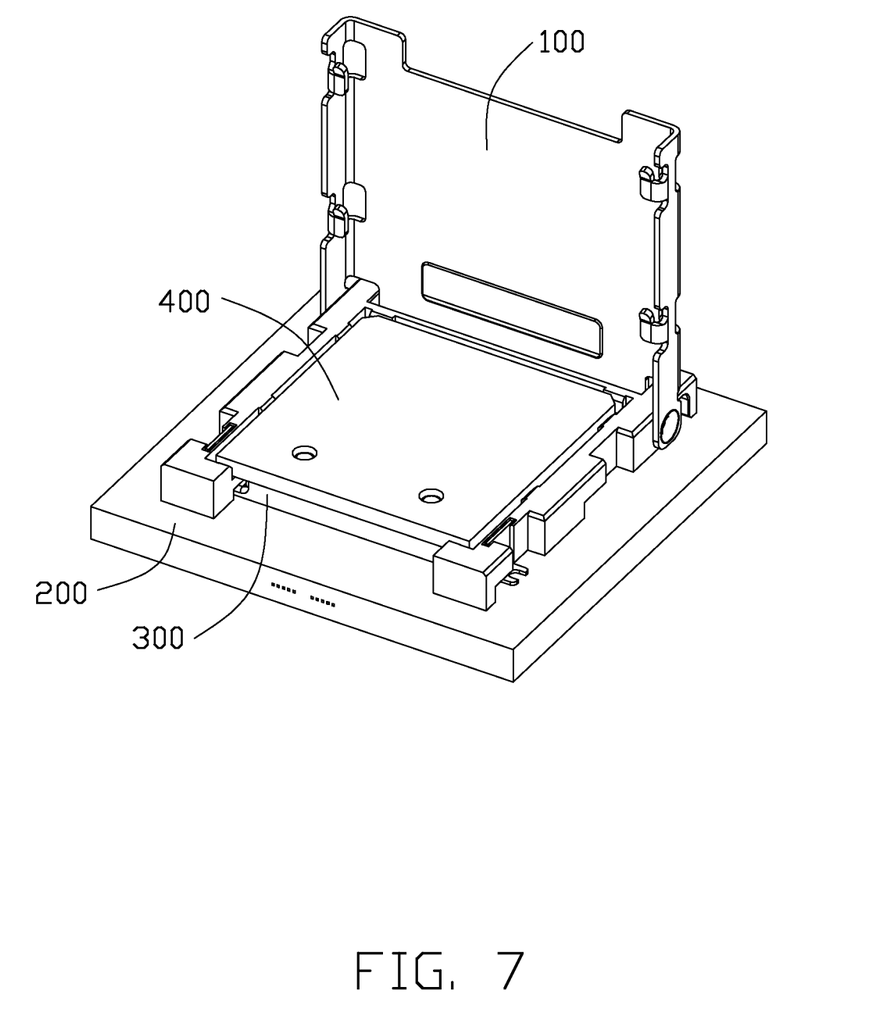
FIG. 7 is an assembled perspective view of a photoelectric connection system of a second embodiment in accordance with the present invention, wherein the cover is in an open statue.
Figure 8:
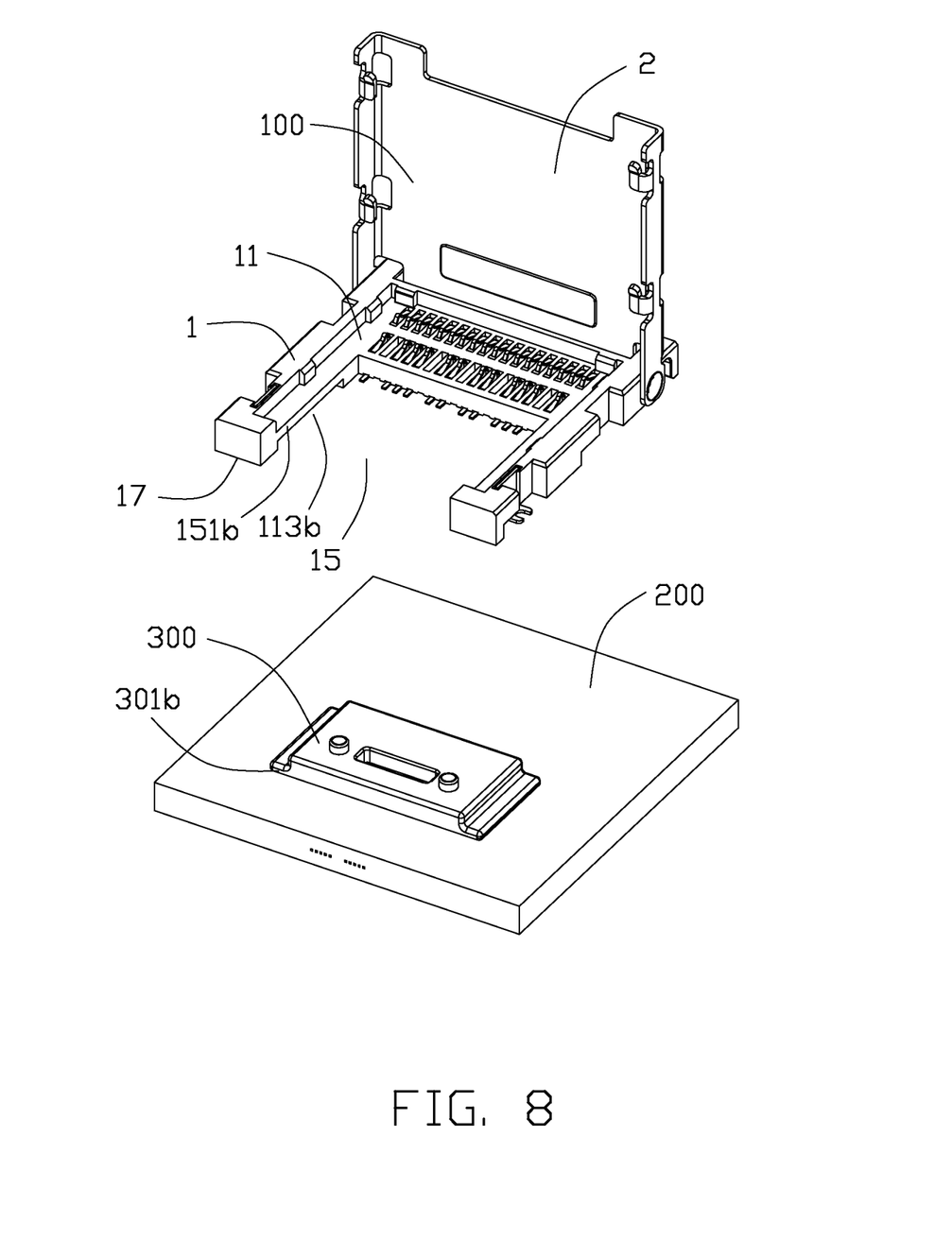
FIG. 8 is an exploded perspective view of system, wherein an upper module is taken off.
Figure 9:
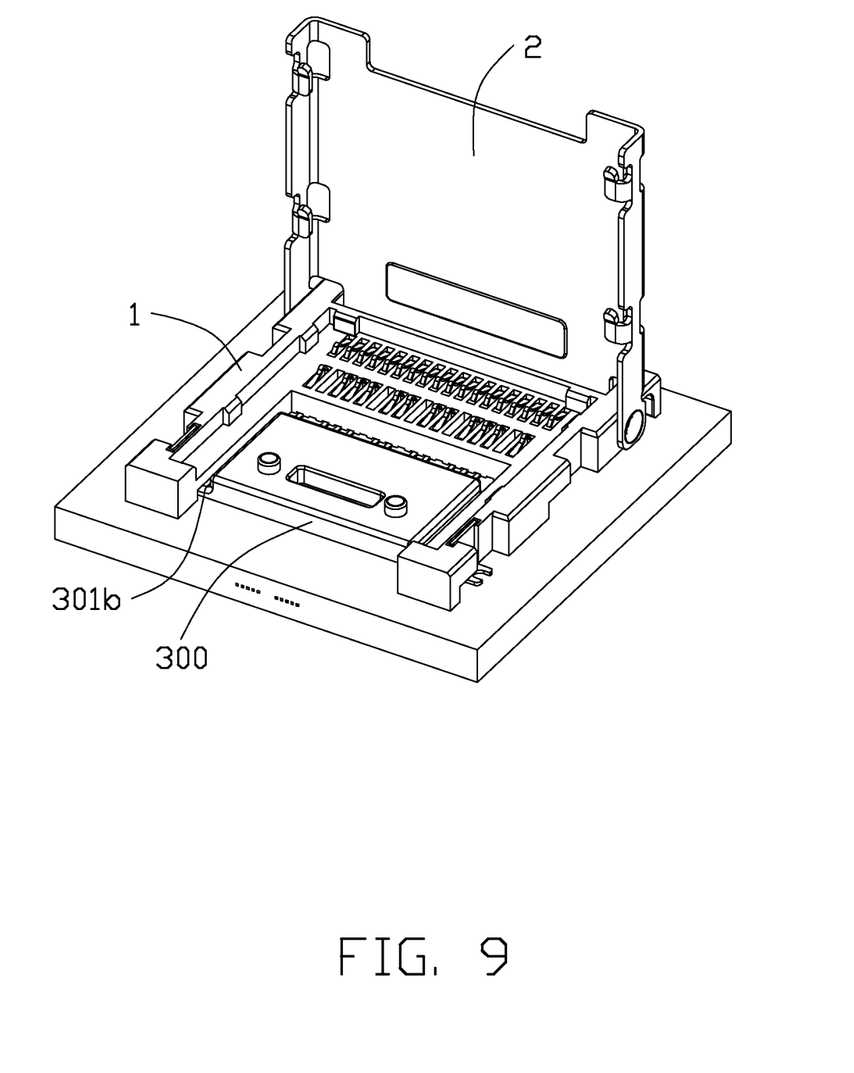
FIG. 9 is a perspective view of the system, wherein the upper module is taken off.

FIGS. 7 through 9 show a second embodiment of this present invention and the description of the same elements to the first embodiment is omitted. Please notes, the different point of this embodiment is that the light transmission module 300 is assembled on the circuit board 200 before the connector. The retaining flanges 301b extend from a lower edge of the light transmission module 300 and the connector defines a pair of containing recesses 113b recessed upward at the second part of the bottom walls. The containing recesses 113b are communicated with the second receiving cavity 15 along the lateral direction and open to a bottom surface 17 of the bottom wall. The light transmission module 300 is set on the circuit board 200 firstly and then the connector is assembled to the circuit board 200 wherein the containing recesses 113b just contains the retaining flanges 301b. The light transmission module 300 of the second embodiment is made from heat-resistant plastic while the light transmission module of the first embodiment is made from general plastic of lower price, such as non-heat-resistant plastic.

However, the disclosure is illustrative only, changes may be made in detail, especially in matter of shape, size, and arrangement of parts within the principles of the invention.

What is claimed is:

1. A photoelectric connection assembly adapted for receiving a photoelectric signal conversion module, comprising:
   a circuit board defines conductive pads on a first surface thereof and waveguides embedded therein;
   an electrical connector assembled to the circuit board, the electrical connector comprising:
     a seat defining a first receiving cavity for receiving the photoelectric signal conversion module and a second receiving cavity below the first receiving cavity;
     a cover rotatably associated with a rear end of the seat and rotating to shield the first receiving cavity;
     a plurality of conductive terminals loaded on the seat and comprising contacting portions extending in the first receiving cavity for electrical connection with the photoelectric signal conversion module and leg portions connecting with the conductive pads of the circuit board; and
   a light transmission module received in the second receiving cavity and comprising a first port coupled with the waveguides of the circuit board and a second port coupled with the photoelectric signal conversion module.

2. The photoelectric connection assembly as described in claim 1, wherein the light transmission module comprises a pair of positioning posts at two sides of each port thereof, the positioning posts are inserted in corresponding positioning holes defined on the circuit board and the photoelectric signal conversion module, respectively.

3. The photoelectric connection assembly as described in claim 2, wherein the seat defines a pair of containing recesses at two sides of the second cavity and communicating with the second receiving cavity, the light transmission module define two retaining flanges at two sides thereof to be received in the containing recesses.

4. The photoelectric connection assembly as described in claim 3, wherein the containing recesses recessed downward and open to the first receiving cavity.

5. The photoelectric connection assembly as described in claim 3, wherein the containing recesses recessed upward and open to the circuit board.

6. The photoelectric connection assembly as described in claim 1, wherein the circuit board therein defines a first groove between the positioning holes and the waveguides extend to the first groove to form a coupling port in the first groove which corresponds to said first port of the light transmission module.

7. The photoelectric connection assembly as described in claim 6, wherein the coupling port is in an inner bottom face of the first groove and the first port is defined on a lower surface of the light transmission module.

8. The photoelectric connection assembly as described in claim 7, the light transmission module defines a second groove between the positioning holes recessed from an upper surface thereof, the second port is contained in the second groove.

9. The photoelectric connection assembly as described in claim 1, wherein said first port, the second port and the coupling port are in a form of one row lenses.

10. An electrical connector used in a photoelectric connection system, comprising:
   an insulating seat comprising a bottom wall and four sidewall upright extending from the bottom wall commonly defining a first receiving cavity, the bottom wall being cut out at a front portion thereof to be defined as a second cavity;
   a cover rotatably associated with a rear end of the seat and rotating to shield the first receiving cavity; and
   a plurality of conductive terminals loaded on a rear portion of the bottom wall and comprising elastic contacting portions extending in the first receiving cavity and board connecting portions;
   wherein the bottom wall defines a pair of containing recesses at two sides of the first receiving cavity, which communicate with the second receiving cavity.

11. The electrical connector as described in claim 10, wherein the containing recesses extend within the second receiving cavity in a front-to rear direction of the electrical connector.

12. The electrical connector as described in claim 11, wherein the containing recesses are recessed downward and open to first receiving cavity.

13. The electrical connector as described in claim 11, wherein the containing recesses are recessed upward and open to a bottom surface of the electrical connector.

14. An photoelectric connection assembly comprising:
   a printed circuit board;
   an electrical connector mounted upon the printed circuit board and defining a receiving space;
   a plurality of electrical contacts disposed in the housing and electrically connected to the printed circuit board;
   a photoelectric signal conversion module received in a portion of the receiving space and mechanically and electrically connected to the contacts; and
   a light transmission module received in another portion of the receiving space and defining a first port optically coupled to the photoelectric signal conversion module and a second port optically coupled to the printed circuit board; wherein an alignment member is defined between the printed circuit board and the light transmission module to align the light transmission module with the printed circuit board for precise optical transmission therebetween.

15. The photoelectric connection assembly as claimed in claim 14, further including another alignment member defined between the photoelectric signal conversion module and the light transmission module to align the light transmission module with the photoelectrical signal conversion module for precise optical transmission therebetween.

16. The photoelectric connection assembly as claimed in claim 14, further including a cover mounted upon the connector to retain the photoelectric signal conversion module in the connector.

17. The photoelectric connection assembly as claimed in claim 14, wherein the photoelectric signal conversion module cooperates with the printed circuit board to sandwich the light transmission module therebetween in a vertical direction.

18. The photoelectric connection assembly as claimed in claim 14, wherein both said light transmission module and said photoelectric signal conversion module are able to be withdrawn from the connector.

19. The photoelectrical connection assembly as claimed in claim 14, wherein a restraining structure is formed between the connector and the light transmission module in a vertical direction.

20. The photoelectrical connection assembly as claimed in claim 19, wherein said restraining structure allows the light transmission module is received in said another portion of the receiving space only after the connector is mounted to the printed circuit board.

* * * * *